United States Patent [19]
Straffon

[11] Patent Number: 5,820,193
[45] Date of Patent: Oct. 13, 1998

[54] TRUCK TAILGATE AUXILIARY STEP

[75] Inventor: Nicholas L. Straffon, Roseville, Mich.

[73] Assignee: The United States of America as represented by the Secretary of the Army, Washington, D.C.

[21] Appl. No.: 733,042

[22] Filed: Oct. 16, 1996

[51] Int. Cl.[6] .................................................. B60R 3/00
[52] U.S. Cl. ......................... 296/62; 280/166; 182/127
[58] Field of Search .............................. 296/50, 57.1, 62; 280/163, 164.1, 164.2, 166; 182/88, 90, 127

[56] References Cited

U.S. PATENT DOCUMENTS

| | | | |
|---|---|---|---|
| 578,332 | 3/1897 | Heaton | 296/62 |
| 688,448 | 12/1901 | Thompson | 296/62 |
| 2,064,803 | 12/1936 | Grove | 72/100 |
| 2,179,412 | 11/1939 | Keuthan | 228/46 |
| 2,568,093 | 9/1951 | Smid et al. | 280/164 |
| 2,580,326 | 12/1951 | Stevens | 228/48 |
| 2,624,058 | 1/1953 | Kudrna | 14/72 |
| 3,584,704 | 6/1971 | Eckmann | 182/90 |
| 3,774,720 | 11/1973 | Hovey | 182/91 |
| 3,826,337 | 7/1974 | Liptak et al. | 182/91 |
| 3,951,431 | 4/1976 | Hopkins | 280/166 |
| 4,639,032 | 1/1987 | Barbour | 296/62 |
| 5,024,292 | 6/1991 | Gilbreath et al. | 182/90 |
| 5,205,603 | 4/1993 | Burdette, Jr. | 296/62 |

*Primary Examiner*—Joseph D. Pape
*Attorney, Agent, or Firm*—Peter A. Taucher; Gail S. Soderling

[57] ABSTRACT

An improved auxiliary multiple step configuration for use on a truck having a rigid step attached to the upper surface of the tailgate and a self storing step which retracts substantially into the tailgate when the gate is closed and deploys automatically when the tailgate is opened.

3 Claims, 3 Drawing Sheets

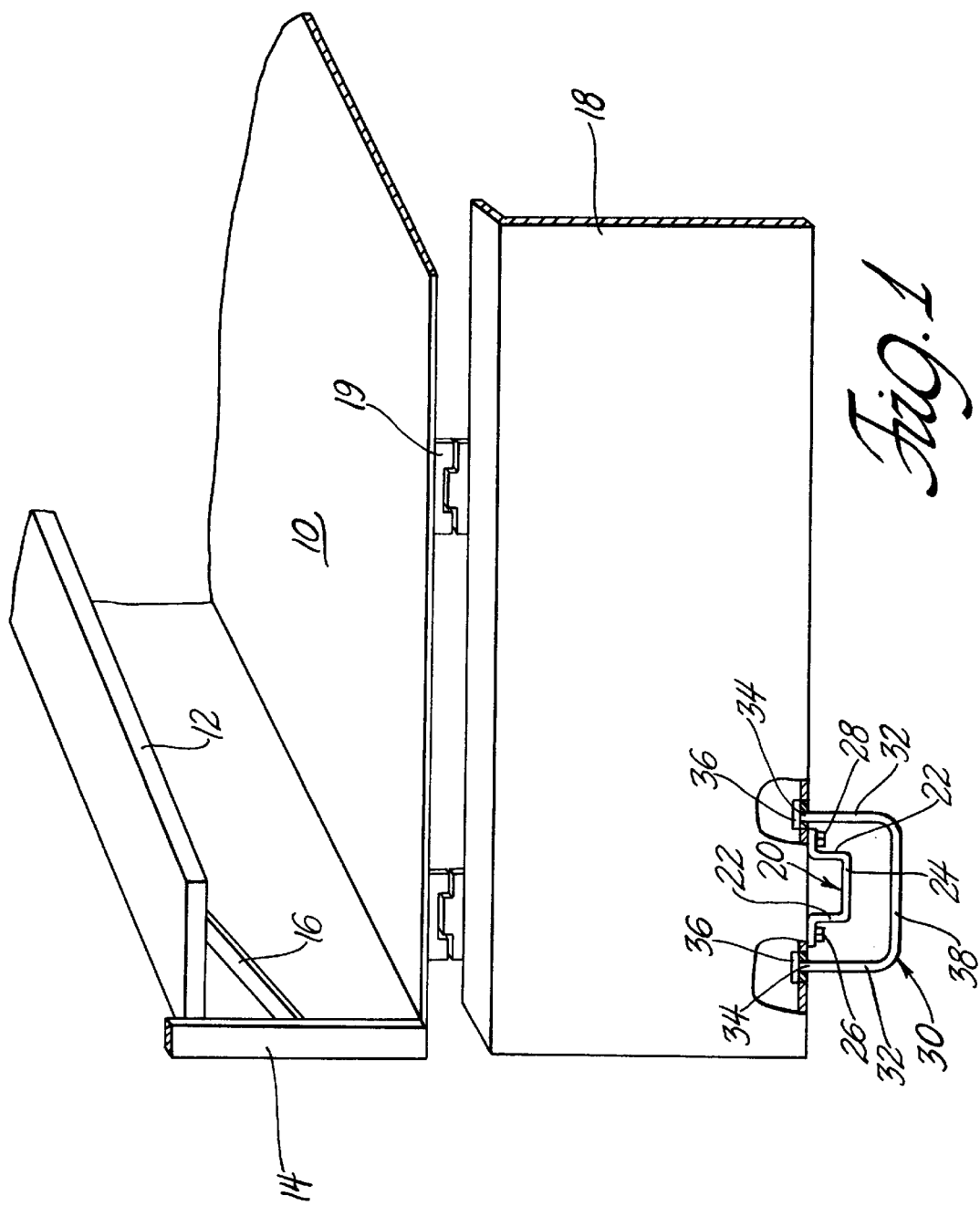

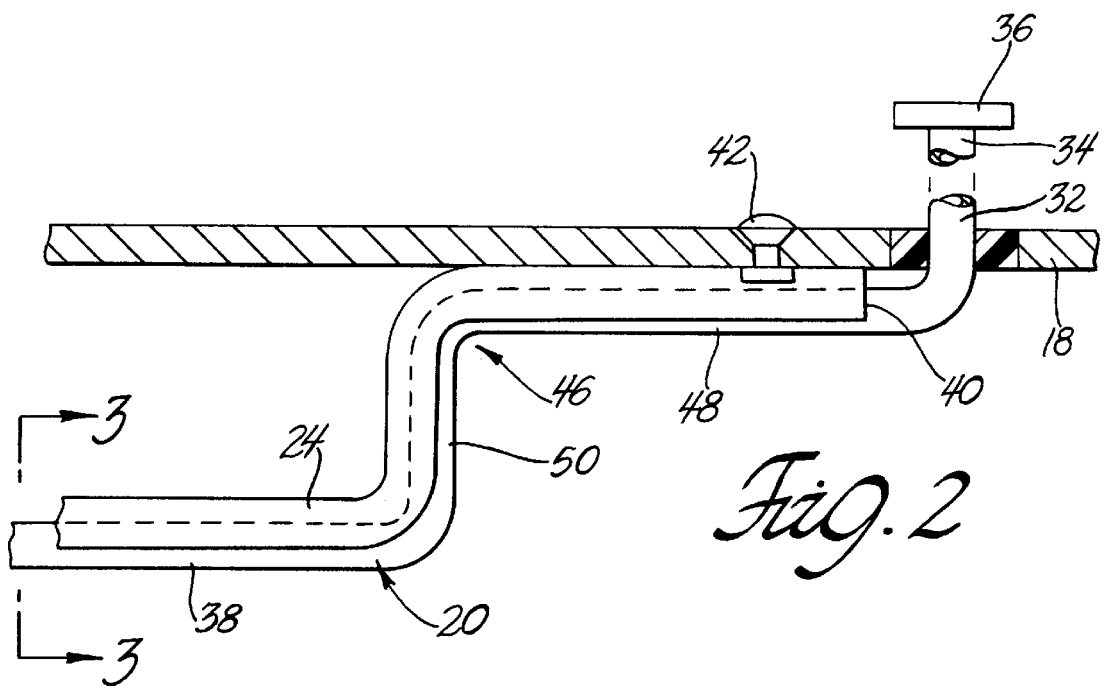
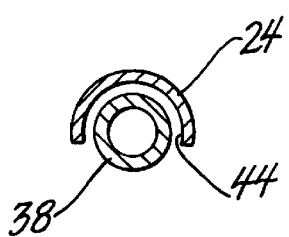
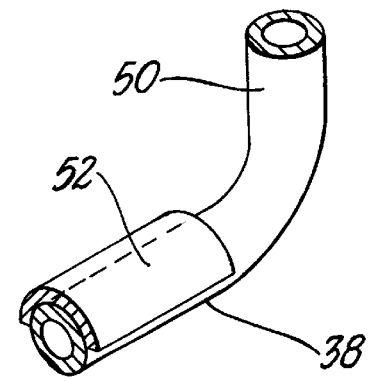

TRUCK TAILGATE AUXILIARY STEP

GOVERNMENT INTEREST

The invention described herein may be made, used and licensed by or for the U.S. Government for governmental purposes without paying me any royalty.

BACKGROUND OF THE INVENTION

1. Field of the Invention

In one aspect this invention relates to tailgate structures useful with large trucks. In a further aspect, this invention relates to an improved step structure for use with large trucks to facilitate ingress and egress by personnel from the vehicle.

2. Prior Art

In general, military cargo vehicles are used to carry troops as well as cargo. Such vehicles are made in a wide variety of sizes and configurations. As such they have different tailgate configurations and cargo bed heights depending on the truck being used. Because military vehicles are designed to operate off road under particularly rough terrain, the axles and bed are usually a substantial distance from the ground making it impossible for a person to enter the vehicle from ground level without an assisting step. Presently the most common means of ingress to the rear of a military cargo vehicle is to install a bracket on the tailgate for as a combination handle and step. Troops entering the vehicle can step onto the bracket and then onto the cargo bed. This configuration presents several problems. First the bracket/step is generally high off the ground when the tailgate is down making it difficult for many troops, particularly shorter troops to use the step. Also the second step from the bracket is still a substantial step. The problems are compounded by the fact that troops are required to enter carrying full battle gear which will weigh 75 or more pounds. The additional weight they carry negatively effects their balance. The resulting structure slows the ingress and egress of troops from the truck and increases the chances for accidents in normal conditions and substantially increases exposure of the troops under battlefield conditions It would be desirable to have a supplemental step associated with the existing tailgate bracket to provide an additional step for the troops when the tailgate is deployed and which will be self storing when the tailgate is in its upright position.

SUMMARY OF THE INVENTION

Briefly the present invention is a self storing, gravity deploying auxiliary step for use with a truck tailgate. The present invention has an auxiliary step associated with a permanent step disposed on the tailgate. The auxiliary step has a pair of spaced parallel legs the parallel legs being disposed with their longitudinal axes parallel to and lying within the plane defined by the tailgate. The parallel legs lie one on each side of the permanent step located on the tailgate so as to bracket the permanent step. The parallel legs have a first end which has stop means that cooperate with the tailgate or associated bracket to allow the parallel legs to move longitudinally but prevent the legs from separating from the tailgate.. A cross arm extends between the second ends of the parallel legs with one end attached to each end of the parallel legs.

BRIEF DESCRIPTION OF THE DRAWING

In the accompanying drawing:

FIG. 1 is a partial perspective view of a truck with its tailgate lowered;

FIG. 2 is a partial view in section of a second embodiment of this invention;

FIG. 3 is a view in section of the embodiment of FIG. 2;

FIG. 4 is a perspective view showing a traction enhancing strip on the auxiliary step.

DETAILED DESCRIPTION

Figure 5:
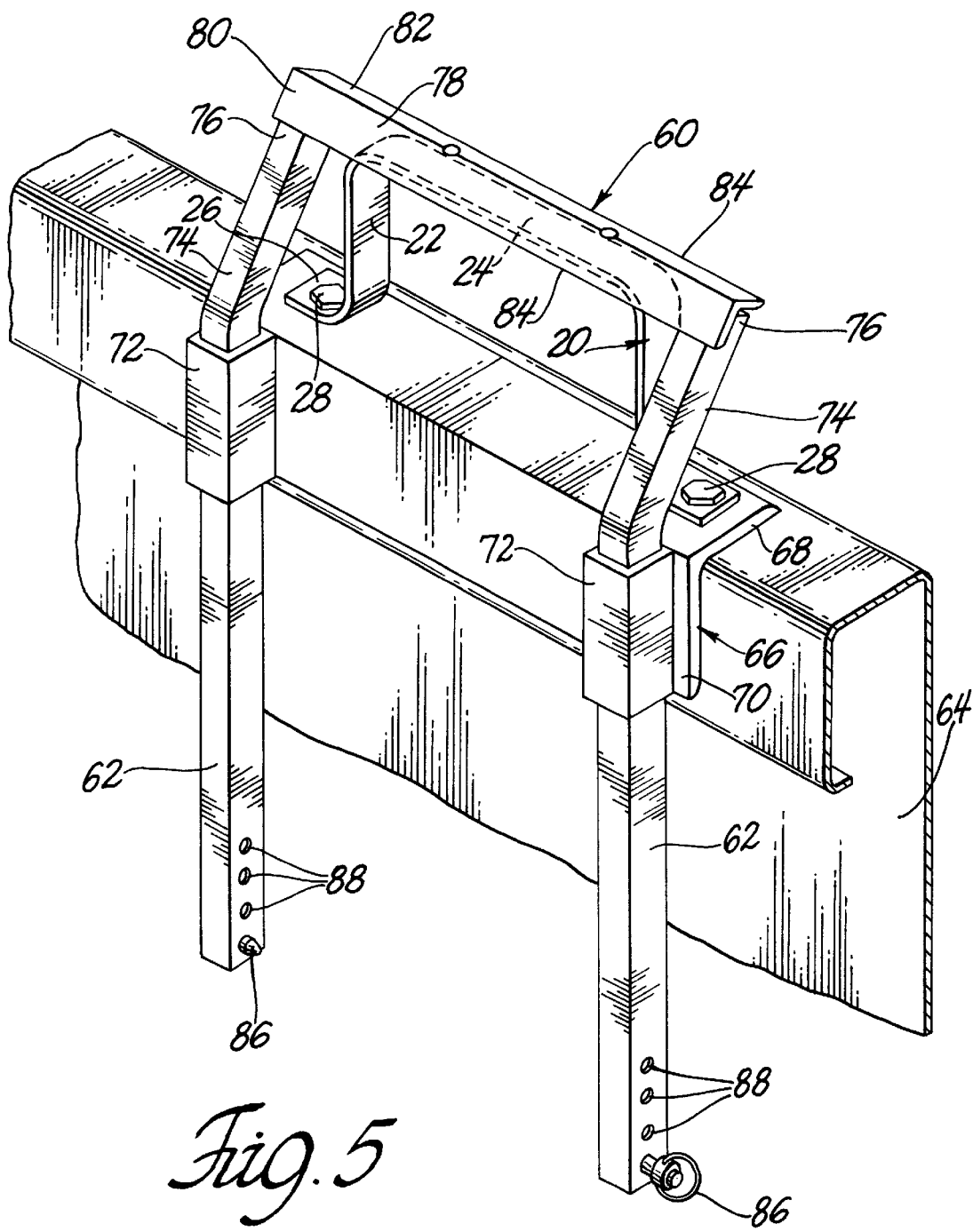
FIG. 5 is a perspective view showing a second embodiment of this invention.

Referring to the accompanying drawing in which like numerals refer to like parts and initially to FIG. 1, a truck (not shown) has a tuck cargo body 10 mounted to the truck in a conventional fashion. The cargo body 10 as shown has a bench 12 attached to the cargo body wall 14 and held in place by braces 16, only one being shown. In this configuration the vehicle can be used to move a number of troops and their equipment. The back of the cargo body 10 is closed by means of a tailgate 18 shown in the open position where the tailgate hangs vertically downward away from the cargo body. The tailgate is attached to the cargo body 10 by a plurality of hinges 19 one-half of the hinges being attached to the cargo body and the other, mating half, being attached to the tailgate 18.

In FIG. 1 the tailgate 18 has a first rigid step 20 affixed to the tailgate's surface so it extends downward from the lowest surface of the tailgate when the tailgate is in the open position as shown. When the tailgate 18 is closed the rigid step 20 will be on the uppermost surface of the tailgate where it can function as a handle. The rigid step has a pair of parallel arms 22 extending perpendicularly outward from the surface of the tailgate and a connecting arm 24 disposed between the parallel arms 22 to form the step. The parallel arms 22 each have an attachment arm 26 which extends outward from the associated parallel arm along the tailgate surface. The attachment arms 26 are fastened to the tailgate such as by the use of a threaded fastener 28.

The rigid step 20 has an deployable, auxiliary step 30 associated with and juxtaposed to the first step. The auxiliary step 30 is designed to deploy, that is extend downward towards the ground when the tailgate 18 is moved to the open, lowered position as shown in FIG. 1 and will move to a position near the rigid step 20 when the tailgate is in the closed position. As shown in FIG. 1, the auxiliary step is in the deployed position and extends downward as far as it will go. The auxiliary step 30 has a pair of parallel legs 32, the legs moving to a position substantially within the tailgate 18 when the tailgate is in the upright position. The parallel legs 32 have a first end 34 located and retained within the interior of the tailgate, the first end having a boss 36 formed on the end. The aperture is sized smaller than the boss 36 to prevent the boss from passing through the aperture so as to retain the boss within the tailgate 18. The parallel legs 32 extending through the aperture in tailgate 18 terminate in a second end. A connecting leg 38 joins the second ends of parallel legs 32 to form a step or rung disposed at a position closer to the ground than the rigid step 20. The parallel legs 32 are disposed so as to bracket the parallel arms of the rigid step 20 attached to the tailgate 18 and are free to move along their longitudinal axes from the storage position when the tailgate is upright to the extended position when the tailgate is in its open position.

FIGS. 2 and 3 show an alternative embodiment providing a reduced height configuration where the rigid step 20 is formed with a channel configuration so that a substantial portion of the auxiliary step fits within the channel to reduce the overall height of the configuration. As shown in FIG. 2, the parallel legs 32 are located at a position near the end 40 of the portion of the rigid step attached to the tailgate 18 only a portion of the surface being shown in this view. The rigid step 20 is attached to the tailgate 18 by means of one or more rivets 42 passing through a section of the rigid step extending along and juxtaposed to the tailgate 18. The rivets 42 will hold the rigid step securely in place and can be formed so as to minimize their protrusion into the channel in the rigid step. In FIG. 3 the cross section shows how the connecting arm 24 is formed as a half circle making a channel 44 which will accept the connecting leg 38 formed as a circular cross section and cradles it when the tail gate is in the closed position. As shown in FIG. 2, the tailgate 18 has been opened and the view is just prior to the point where the auxiliary step 30 will begin to deploy under the influence of gravity.

As shown in FIGS. 2 and 3, the auxiliary step is formed with an L-shaped portion 46 connecting the parallel legs 32 to the connecting leg 38. The L-shaped portion 46 has a first finger 48 orthogonally mounted to the associated parallel leg 32 the first finger extending toward the connecting leg 38 and positioned to fit in the channel 44 of that portion of the rigid step 20 lying along and juxtaposed the tailgate surface. The L-shaped portion has a second finger 50 orthogonally attached to the first finger 48 and extending away from the tailgate 18 the second finger extending to a point near the connecting arm 24 of the rigid step 20 and being sized so as to rest juxtaposed to the channel in the parallel arm 22 of the rigid step.

FIG. 4 shows the addition of an anti-skid strip 52 on the stepping surface of the auxiliary step connecting leg 38. This configuration will provide enhanced traction to muddy boots and the like and especially in the nesting configuration of FIG. 2 the traction strip will be exposed only when the auxiliary step is deployed protecting the strip from incidental damage and not exposing troops to the abrasive action of the strip when the tailgate is in its closed position.

Referring to FIG. 5, a second embodiment of this invention is shown for use on tailgates where the tailgates internal structure does not allow the parallel legs of an auxiliary step to move within the interior of the tailgate. In such situations the step legs must perforce be mounted so as to move outside the tailgate. In FIG. 5, a tailgate 64 has the rigid step 20 with its parallel arms 22 extending perpendicularly from the tailgate and its connecting arm 24 rigidly mounted to the surface of the tailgate 64 using attachment arms 26 as described above by threaded fasteners 28.

In the structure of FIG. 5, the threaded fasteners 28 also attach an L-shaped bracket 66 having one plate 68 lying along the surface of the tailgate the plate 68 having apertures (not visible in the figure) through which the threaded fasteners pass the threaded fasteners firmly holding the plate in position on the tailgate. The L-shaped bracket has a second plate 70 which extends along a portion of the tailgate and towards the portion of the tailgate which attaches to the truck body.

The second plate 70 has a pair of bracket members 72 shown in the drawing as rectangular cylinder members permanently attached to the second plate and having a longitudinal extending square aperture. The aperture will allow parallel legs 62 of an auxiliary step 60 to move from a first storage position to a second deployed position for use.

The auxiliary step 60 has a pair of parallel arms 62 which are partially disposed in and sized to move longitudinally within the bracket 70. The parallel arms 62 are disposed one on either side of the permanent step 20 and have an oblique extension 74 which extends at an obtuse angle to the longitudinal axis of legs 62, the oblique extension pointing towards and ending at a terminal end 76 near the permanent step 20. The terminal ends 76 will bracket the permanent step and have a cross bar 78 extending between and connected to the terminal ends to provide a deployable auxiliary step. As shown, the cross bar 78 has an angular configuration with one face 80 of the angle attached to the oblique extension 74 and the other face 82 of the angle extending across the end of the oblique extension. The cross bar 78 is formed in an L-shape in the figure but could be also be a rounded semicircle configuration, either configuration forming an auxiliary step having two edges 84 which serve to surround and cradle the permanent step 20 when the tailgate 64 is in the upright, closed position to protect the step and also minimize the height. When the tailgate 64 is lowered and the step 60 deployed, the cross bar 78 step will present the edges 84 as gripping surfaces to engage the tread on the soldiers boots to make for better purchase by the boot limiting slippage and missteps when troops board under the muddy wet conditions frequently found in the field.

The deployable step of FIG. 5 has means to prevent the parallel legs 62 from slipping out of the bracket 72 the means being shown as a pin 86 transversely disposed across the parallel legs 62 to prevent the ends of the legs from passing through the bracket 72. The pins 86 can be easily removed to replace the deployable step 60. Because the military fleet has a wide variety of vehicle sizes and numerous configurations, a plurality of apertures 88 are formed in the longitudinal the legs along the leg allowing the pins 86 to be moved so that the step can be sized to deploy at different lengths depending on the size of the tailgate and the vehicle to which it is attached. This allows a common step configuration to be installed an a variety of different configurations and tailgates.

Various alterations and modifications will become apparent to those skilled in the art without departing from the scope and spirit of this invention and it is understood this invention is limited only by the following claims.

What is claimed is:

1. An improved auxiliary multiple step configuration useful with military vehicles having a tailgate which is lowered for the entry of personnel to a cargo area of the truck, the improved step structure including: a first rigid step attached to the upper surface of the tailgate when the tailgate is in the upright, cargo carrying position, the first rigid step has a pair of parallel arms extending at right angles to the upper surface of the tailgate, the parallel arms have a connecting arm disposed between the ends of the parallel arms which are distal from the point at which the arms are attached to the upper surface of the tailgate to form a step which is spaced from the upper surface of the tailgate; a second deployable step associated with the first rigid step, the deployable step having a pair of parallel legs the parallel legs being disposed substantially within the tailgate when the tailgate is in its upright position, the legs having a first end located and retained within the interior of the tailgate, the first end having a boss formed thereon, the legs extending out through an aperture formed in the upper surface of the tailgate, the aperture being smaller than the boss to retain the boss within the tailgate, the parallel legs having a second end which is outside the tailgate and extends away from the surface of the tailgate a connecting arm attached to each of the second ends of the parallel legs to form a step there between the parallel legs being disposed so as to bracket the first rigid step attached to the tailgate, the parallel legs being free to move along their longitudinal axes from a storage position substantially within the tailgate when the tailgate is in its upright transport position, to an extended position when the tailgate is in its lowered loading position, the movement from the storage to the deployed position being accomplished by means of gravity.

2. The improved auxiliary multiple step configuration of claim 1 wherein the connecting arm of the rigid step has a curved upper surface having a concave surface facing the deployable step, the connecting arm concave surface being adapted to receive the deployable connecting arm portion when the second step is in its storage position.

3. The improved deployable auxiliary step of claim 1 where the surface of the deployable step which lies juxtaposed the fixed step has a traction enhancing coating thereon, the traction coating enhancing surface being shielded by the concavity of the rigid step when the deployable step is in its stored, undeployed position.

* * * * *